US005393160A

United States Patent [19]

Ojima

[11] Patent Number: 5,393,160
[45] Date of Patent: Feb. 28, 1995

[54] TORSION BAR FOR SLOW-ACTING ROTATION SHAFT DEVICE

[75] Inventor: Juji Ojima, Aikawa, Japan

[73] Assignee: NHK Spring Co., Ltd., Kanagawa, Japan

[21] Appl. No.: 116,831

[22] Filed: Aug. 11, 1993

Related U.S. Application Data

[63] Continuation of Ser. No. 767,790, Oct. 1, 1991, abandoned.

[30] Foreign Application Priority Data

Oct. 1, 1990 [JP] Japan .................................. 2-264615

[51] Int. Cl.[6] .............................................. F16C 11/04

[52] U.S. Cl. .................................... 403/120; 403/163; 403/91; 403/24; 16/308

[58] Field of Search ................. 403/161, 163, 120, 91, 403/24, 25; 16/308, 75; 267/154; 4/240, 236; 464/97; 248/923, 372.1

[56] References Cited

U.S. PATENT DOCUMENTS 2,707,799 5/1955 Butterfield ........................ 16/308 X
2,799,891 7/1957 Ragsdale .............................. 16/308
2,810,153 10/1957 Semar .................................. 16/308

FOREIGN PATENT DOCUMENTS 2605041 4/1988 France .................................. 16/75

*Primary Examiner*—Randolph A. Reese
*Assistant Examiner*—Harry C. Kim
*Attorney, Agent, or Firm*—Keck, Mahin & Cate

[57] ABSTRACT

A torsion bar for a slow-acting rotation shaft device is formed from a U-shaped wire rod so that hook portions formed at both ends of the torsion bar are distanced from each other by a length at least more than a diameter of the wire rod. Hook portions for latching are formed at each end and at the U-shaped bend of the torsion bar.

7 Claims, 2 Drawing Sheets

(a)
PRIOR ART (b)
PRIOR ART (c)
PRIOR ART

TORSION BAR FOR SLOW-ACTING ROTATION SHAFT DEVICE

This is a continuation of application Ser. No. 07/767,790, filed Oct. 1, 1991, now abandoned.

BACKGROUND OF THE INVENTION

This invention relates to a torsion bar which is used for a slow-action rotation shaft device which supports a second member which rotates relatively with respect to a first member.

Such torsion bar for a slow-acting rotation shaft device is used for a switch device at a rotatably supporting portion of a compact case, toilet, radio cassette, a dash board of a car or the like.

Such slow-acting rotation shaft device includes a shaft 3 which rotatably supports a rotative member 1 which relatively rotates with respect to a fixed member 2 as shown in FIG. 4.

The shaft 3 is, as shown FIG. 5 and FIG. 6, includes a hollow shaft body 31, cap members 32 and 33 outwardly inserted to both side portion of the shaft body 31 rotatably, two torsion bars 4 and 4 latched one end of hook portion 41 into the shaft body 31 and another end of hook portion 42 into the cap member 33, and a viscous grease (not shown) enclosed between shaft body 31 and cap members 32 and 33.

The shaft body 31 is provided with a stepped shaft having small diameter shaft portions 31*b*, 31*b* outwardly inserted the cap members 32 and 33 rotatably to both sides of a large diameter shaft portion 31*a* of the middle portion thereof and further provided with a slit penetrated hole 34 in a length direction. A key 35 is projectingly formed at the large diameter porion 31*a*. Each of cap members 32 and 33 is formed as a cylinder having a bottom wherein the inner diameter thereof is the same as the outer diameter of the small diameter shaft portion 31, while the outer diameter thereof is the same as the outer diameter of the large diameter shaft portion 31*a*, and the key 37 and 38 are projectingly formed at the outer circumference of each cap member 32 and 33.

At the bottom of the cap member 33, a concave slit 36 is formed. Each of cap members 32 and 33 is outwardly inserted into each of small diameter shaft portions 31*b* and 31*b* and the ring grooves 32*a* and 33*a* are inserted into ring rib 31*c* of each small diameter shaft portion 31*b* to intend to stop the slipping out, whereby the cap members 32 and 33 are combined with shaft body 31 rotatably.

In this combined state, torsion bars 4 and 4 are inserted into the penetrated hole 34 of the shaft body 31, one end hook portion 41 and another end one 42 are latched to the penetrated hole 34 and the concave slit 36 of the cap member 33 respectively to combine therewith, and the viscous grease is enclosed between cap members 32 and 33 and each small diameter portion 31*b*.

In shaft 3 thus combined, the large diameter shaft portion 31*a* is positioned in the supporting portion at bearing portions 11 and 12 of the rotatative member 1 respectively, and each key 35, 37 and 38 is inserted into the key grooves (not shown) formed at rotatably supporting portion 21 and bearing portions 11 and 12 respectively, thereby attaching the large diameter portion 31*a* to a rotatably supporting portion 21 and cap members 32 and 33 to the bearing portions 11 and 12 respectively in an unrotatable state.

In the conventional slow-acting rotation shaft device thus constructed, though the rotative member 1 rotates by the torque of the torsion bars 4, 4, a viscous resistance of the viscous grease occurs at the time of the rotation, the rotation member 1 can be rotated with a slow speed in spite of the torque load of the torsion bars 4,4.

In a thus slow-acting rotation shaft device, since it is necessary to rotate the rotative member 1 against the viscous resistance of the viscous grease, the torsion bar 4 used must be one which can provide a torque necessary for the above rotation. In order to obtain such torque, the diameter of the wire rod of the torsion bar could be increased, but, this increases the stress of the torsion bar itself which causes a permanent set or a breakage. Accordingly, as described above, heretofore a plurality of torsion bars 4 having a small wire rod diameter and the same length have been used to obtain the torque described above.

However, since this conventional torsion bar for a slow-acting rotation shaft device uses a plurality of torsion bars 4 having the same length, when the torsion bars 4 are twisted, ends of hook portions 41, 41 and the other ends of hook portions 42, 42 of the torsion bars interfere with each other and it is impossible to obtain good operation.

Thus, this invention is needed. The object is to provide a torsion bar for a slow-acting rotation shaft device without using a plurality of torsion bars.

SUMMARY OF THE INVENTION

In order to attain the above object, this invention is characterized in that in a slow-acting rotaion shaft device which energizes the second member in an opening direction resisting the viscous resistance of the viscous grease maintained at the rotatably supporting portion by the torsion bar attached at the rotatably supporting portion of the second member, which rotates relatively with respect to the first member, the torsion bar is formed by being bent so that the distance between the hook portions formed at both ends of the torsion bar may be more than at least more than the diameter of the wire rod, in the length direction. The hook portion exclude a first hook portion for latching at one end and a second hook portion for latching at the other end is formed at the above bent portion.

The distance between the hook portions formed at both ends of the torsion bar is formed by bending the wire so that the ends are separated by at least more than the diameter of the wire rod in the length direction of the torsion bar. Even when the twisting force is loaded to the torsion bar neither relative interference of the hook portions occurs nor anomalous sound generates at the hook portion of one end latching portion.

Further, since the torsion bar is formed by being bent, the same torque as previously provided by the plurality of torsion bars can be obtained.

BRIEF DESCRIPTION OF THE DRAWING

FIG. 1(*a*), and FIG. 1(*b*) show an elevation view, and a side view respectively.

FIG. 6(*b*) is a sectional view along the line b—b of the shaft of FIG. 5, and

FIG. 6(*c*) is a left side view of another cap member of the shaft of FIG. 5.

DETAILED DESCRIPTION OF THE INVENTION

Figure 1:
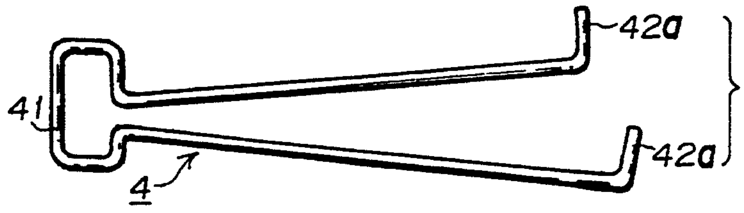
FIG. 1 shows a torsion bar of an embodiment according to this invention.
Figure 1:
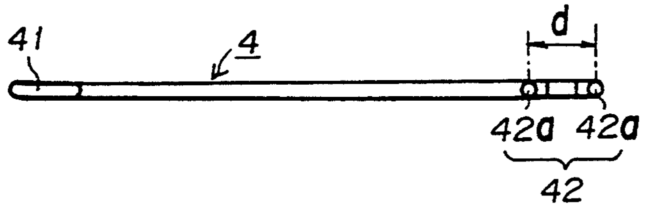
Figure 2:
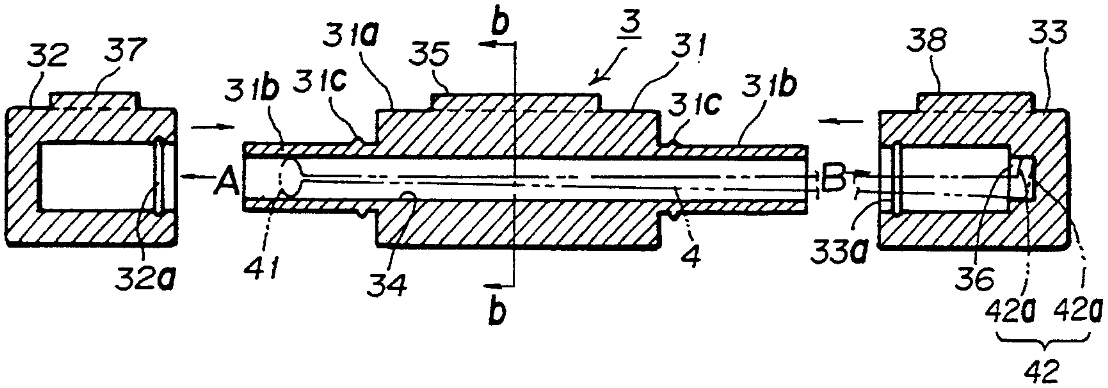
FIG. 2 is an exploded logitudinal sectional view of a slow-acting rotation shaft device according to this invention.
Figure 3:
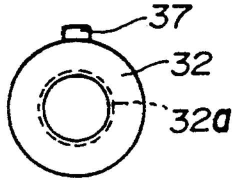
FIG. 3(*a*) is a right side view of a cap member at one end of the above shaft body, FIG. 3(*b*) is a sectional view along the line b—b of the above shaft body and FIG. 3(*c*) is a left side view of the cap member of another end of the above shaft body.
Figure 3:
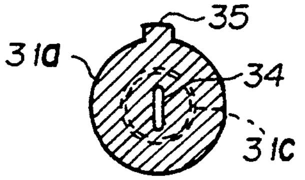
Figure 3:
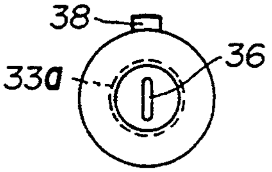

Referring to the embodiment of this invention shown in FIG. 1 to FIG. 3 wherein the same element as in the conventional art is shown with the same numeral.

FIG. 1 shows a torsion bar 4 of an embodiment of this invention.

The torsion bar 4 is formed by a bent wire rod having an approximately two times of length for use at an approximately middle portion thereof. The wire rod is provided with L-shaped hook portions 42*a* and 42*a* at both ends thereof, and the bending is performed so that the distance of hook portions 42*a* and 42*a* of both ends may be shifted by d in the length direction (FIG. 1(*b*)) and be slowly opened towards hook portions 42*a*, 42*a* of the both ends in a free state. The distance d between 42*a* and 42*a* maybe at least the same as a diameter of the wire rod.

The hook portions 42*a*, 42*a* of the torsion bar 4 forms hook portions 42, 42 for latching at one end and forms a hook portion for latching 41 at the outer end having an approximately C-shape at the bending portion thereof.

The torsion bar 4 thus formed is incorporated into the shaft 3 which constitutes the slow-acting rotation shaft device.

The shaft 3 comprises:

a hollow shaft body 31; cap members 32 and 33 outwardly inserted to the both ends of the shaft body 31, rotatably; a torsion bar 4 wherein the hook portion for latching 41 at one end thereof is latched in the shaft body 31, while hook portion for latching 42 at the outer end thereof is latched in the cap member 33; and a viscous grease (not shown) enclosed between the shaft body 31 and the cap members 32 and 33.

The shaft body 31 is formed by a stepped shaft having small diameter shaft portions 31*b*, 31*b* outwardly inserted into the cap members 32 and 33 rotatably at both sides of the large diameter shaft portion 31*a* at a middle portion of the shaft 3 and a slit penetrated hole 34 therethrough.

The cap members 32 and 33 are formed together with a cylinder having a bottom outwardly inserted to the small diameter shaft portion 31*b* of the shaft body 31, the bottom of the cap member 33 is provided with a slit concave portion 36. The outer diameter of each cap member 32 and 33 outwardly inserted to the small diameter shaft portion 31*b* is formed to have the same outer diameter as that of the large diameter shaft portion 31*a* of the shaft body 31.

The cap members 32 and 33 are incorporated into the shaft body 31 rotatably by being outwardly inserted to each small diameter shaft portions 31*b*, 31*b* and inserting the ring grooves 32*a* and 33*a* of the both members over the ring rib 31*c* to stop slipping out of the cap member.

In this combined state, the torsion bar 4 is inserted into the penetrated hole 34 of the shaft body 31 whereby the hook portion for latching 41 at one end side of the torsion bar 4 is latched to the penetrated hole 34, while the hook portion for latching 42 at another end side is latched to the concave portion 36 of the cap member 33 in a state wherein the hook portions 42*a*, 42*a* are drawn thereto. Further, the viscous grease is enclosed between cap members 32, 33 and each small diameter shaft portion 31*b* respectively.

Figure 4:
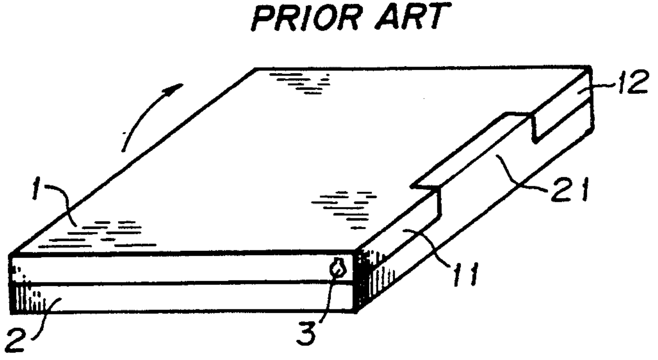
FIG. 4 PRIOR ART
FIG. 4 is a whole perspective view which shows an embodiment of a conventional slow-acting rotation shaft device.
Figure 5:
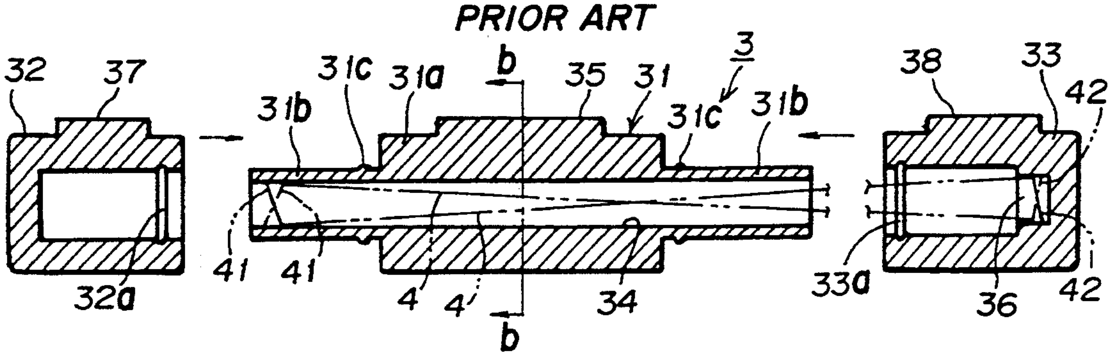
FIG. 5 PRIOR ART
FIG. 5 is an exploded logitudinal sectional view of a shaft of the device of FIG. 4.
Figure 6:
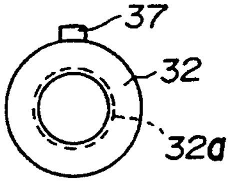
FIG. 6(*a*) is a right side view of one end cap member of the shaft of FIG. 5.
Figure 6:
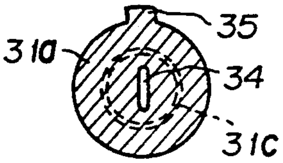
Figure 6:
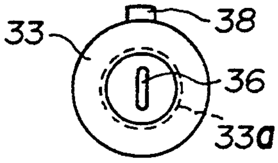

The shaft 3 thus constructed is attached to the rotatably supporting portion of the rotative member 1 shown in FIG. 4 thereby supporting the rotative member 1 rotatably against the fixed member 2. At this time, the large diameter shaft portion 31*a* of the shaft body 31 in the shaft 3 is positioned in the rotatably supporting portion 21 of the fixed member 2 and the cap members 32 and 33 are positioned respectively in bearing portions 11 and 12 of the rotative member 1 and further each key 35, 37 and 38 are inserted into key grooves (not shown) formed at the rotatably supporting portion 21 and bearing portions 11 and 12 respectively whereby the shaft body 31 and the cap members 32 and 33 are attached to the fixed member 2 and the rotative member 1 in an inrotatable state.

In the slow-acting rotation shaft device thus constructed, the shaft body 31 is integrally fixed with fixed member 2, while the cap members 32 and 33 rotate integrally with rotative member 1. Further, the torque of the torsion bar 4 is transmitted to the rotative member 1 via cap member 33 and the rotative member 1 rotates with respect to the fixed member 2 together with cap members 32 and 33 by this torque transmission. The rotation of the rotative member 1 at this time is performed with a slow speed due to the viscous resistance of the viscous grease enclosed between cap members 32, 33 and each small diameter shaft portion 31*b* of the shaft body 31.

The torsion bar 4 obtains the same torque as that of the conventional two torsion bars, and further there exists no relative interference between hooks 42*a* and 42*a* which constitute the hook portion for latching 42 at one end side whereby a good operation can be obtained without the occurence of anomalous sound during the rotation of the rotative member 1.

In such a slow-acting rotation shaft device, the provision of the initial torque to the torsion bar 4 is performed by the following means:

In case of attaching the shaft 3 to the rotatably supporting portion of the rotative member 1, the shaft body 31 is attached to the rotatably supporting portion 21 of the fixed member 2, then the hook portion for latching 41 at one end side of the torsion bar 4 is latched to the penetrated hole 34 and the hook portion 42 is latched to the concave portion 36 of the cap member 33 in a state wherein the hook portion for latching 42 at the other end is projected toward the bearing portion 12 of the rotative member 1. In this state, after twisting the torsion bar 4 properly by rotating the cap member 33, the cap member 33 is pushed on to the shaft body 31 together with the torsion bar 4 as it is whereby the cap member 33 is attached inrotatably to the rotative member 1 by inserting the key 38 of the cap member 33 to the key groove of the bearing portion 12. By this, the initial torque can be provided to the torsion bar 4.

The torsion bar for slow-acting rotation shaft device according to this invention is, as described in the above embodiment, not limited to one having only one bending portion, but may be more than two.

Further, the torsion bar 4 of this invention may be combined by latching the hook portion for latching 42 at one end side to the penetrated hole 34 and the hook portion for latching 42 at another end side to the concave portion 36.

Since this invention is a torsion bar wherein the distance between both hooks formed at both ends is formed to be bent so that the distance may be shifted at least more than a diameter of the wire rod in the length direction, the same torque as a plurality of torsion bars can be obtained and even when a twisting force is loaded to the torsion bar, a relative interference between both hooks which constitute the hook portion for latching at one end side does not occur. Accordingly, there is no occurence of an anomalous sound and a good operation can be obtained.

What I claim is:

1. A combination of a case and a torsion bar for a slow-acting rotation shaft device comprising:

a case having a first stationary member including a first elongated hole portion extending therethrough and a second member rotatable about the stationary member having a second elongated hole portion communicating coaxially with said first elongated hole portion at an end thereof; and a torsion bar comprising a substantially U-shaped wire rod having first and second hook portions respectively extending in the same direction from ends of first and second legs thereof, wherein a U-shaped intermediate portion of the torsion bar is held in said first elongated hole portion in said stationary member and the first and second hook portions of said torsion bar are engaged in said second elongated hole portion;

whereby the torsion bar energizes said second member in an open direction against a viscous resistance of a viscous grease for slow-acting rotation of the second member with respect to the first member and torque is obtained on rotation of the second member relative to the first member.

2. A combination according to claim 1 wherein the first and second hook portions are engaged in a slit in said second elongated hole portion.

3. A combination according to claim 1 wherein the first and second legs of said torsion bar are of different lengths.

4. A combination according to claim 3 wherein the difference in length between said first leg and said second leg is at least more than a diameter of the wire rod.

5. A combination according to claim 3 wherein the torsion bar comprises a third hook portion formed at a bending portion of said torsion bar.

6. A combination according to claim 5 wherein the third hook portion is engaged in a slit in said first elongated hole portion.

7. A combination of a case and a torsion bar for a slow-acting rotation shaft device comprising:

a case having a first stationary member including a first elongated hole portion extending therethrough and a second member rotatable about the stationary member having a second elongated hole portion communicating coaxially with said first elongated hole portion; and a torsion bar which energizes the second member in an open direction against viscous resistance of a viscous grease for slow-acting rotation of the second member with respect to the first member; said torsion bar being engaged with a rotatably supporting portion of the second member which rotates relatively with respect to the first member, said torsion bar comprising a substantially U-shaped wire rod having first and second hook portions respectively extending in the same direction from ends of first and second legs thereof, wherein said first and second legs are of different lengths and a distance between said hook portions is formed of at least more than a diameter of the wire rod in a length direction and a third hook portion is formed at a bending portion of said U-shaped wire rod, wherein said first and second hook portions both engage in a single slit in the rotatably supporting portion of the second member and the third hook portion engages in a slit in the first member, whereby torque is obtained on rotation of the second member relative to the first member, wherein said first and second hook portions do not interfere with each other during said rotation.

* * * * *